Reissued May 15, 1928. Re. 16,963

UNITED STATES PATENT OFFICE.

HUGO MANOVILL, OF JACKSON HEIGHTS, NEW YORK.

METHOD OF DECORATING ARTICLES AND DECORATED ARTICLE.

No Drawing. Original No. 1,636,523, dated July 19, 1927, Serial No. 93,793, filed March 10, 1926. Application for reissue filed March 14, 1928. Serial No. 261,694.

My invention relates to a new and improved method of decorating celluloid articles and to a new and improved decorated celluloid article. This invention is also applicable to decorating surfaces made of material other than celluloid.

This application is in part a continuation of my previously filed application Serial No. 60,304, filed October 3, 1925.

One of the objects of my invention is to devise a new and improved method of decorating a celluloid article to produce cloisonné effects.

Another object is to devise a method whereby such cloisonné effects can be produced on differently colored backgrounds.

Another object of my invention is to produce an article having a durable cloisonné decorative effect.

Other objects of my invention will be set forth in the following description which will set forth a preferred embodiment, it being understood that the above general statement of the objects of my invention is intended to merely generally explain the same, and not to limit it in any manner.

My method can be employed for decorating a celluloid block or article of any kind, size, or shape, and is particularly intended for decorating toilet articles, such as brushes, mirrors, toilet sets. etc.

The object to be decorated, which may be designated as the "base" is first given a colored surface coating. For this purpose, any suitable dye (such as an aniline dye) or any suitable pigment, is thinned with or dissolved in a celluloid solvent, such as ethyl acetate. The thinned coloring liquid is then thoroughly stirred and strained through cheesecloth. Practical experience has shown that when the coloring agent is thinned with acetone or the like, that the color forms little lumps on the base when it is sprayed on, unless certain precautions, such as the stirring and straining above mentioned, are observed.

However, little lumps of color pass through the cheesecloth or form afterwards. and hence the thinned coloring agent is sprayed on the base by an air-brush, operating under a pressure of about thirty (30) pounds per square inch. The purpose of thinning the coloring agent with a celluloid solvent is to cause the coloring agent to blue color to a "smoke" blue or cloudy blue, form a very durable color coating. While I do not wish to limit myself to a pressure of thirty pounds, experience has shown that a much smaller pressure will prevent the coloring agent from penetrating the base uniformly to form a uniform color layer on articles of substantial size, and that a much greater pressure forces out of the cup of the air-brush little lumps of sediment which have passed through the strainer, or which have formed there. I prefer to use pigment colors, such as enamels used on automobiles, because they resist the action of sunlight, etc.

The thinned coloring compound should flow about as readily as water, so that it spreads readily and can be readily sprayed. The volatile solvent ingredients of the coloring compound are allowed to evaporate, so that a dry, uniform colored surface is produced on the base.

Experience has shown that if a line design is produced on this colored surface by engine-turning, for example, that the engraving tool causes the colored layer to chip, so that sharp clean lines are not uniformly produced in a large run. The percentage of spoiled pieces is considerable. Hence, I prefer to protect the colored layer, before engraving the design by a tool which penetrates through the color into the base, by means of a thin superposed layer of fish-scale, for example. This protective layer of fish-scale is formed by taking the commercial fish-scale solution, thinning it with a suitable celluloid solvent (like acetone) until the solution flows about as readily as water and then spraying this solution by means of an air-brush operating under a pressure of thirty pounds per square inch. This fish-scale layer may contain some celluloid. Thus the commercial fish-scale solution may be thinned with a celluloid lacquer.

This first coating of fish-scale penetrates the color to a certain extent. and hence it hardens the colored layer. This is allowed to thoroughly dry and harden before the engraving operation. This coating of fish-scale also modifies the original color of the colored layer and this is also done by subsequent coatings. For example, if the enamel originally used has a deep blue color, the addition of a suitable number of layers of fish-scale, as later disclosed, changes this blue color to a "smoke" blue or cloudy blue, which is highly desirable. I prefer to add no celluloid to the fish-scale solution, but to merely thin it with commercial acetone.

Even if the white celluloid base is not colored, it is desirable to form a fish-scale coating before engraving, because this produces a desirable color effect.

In addition to the intaglio design on the celluloid base, a surface design might be formed by painting or the like, and this surface design could be accentuated and made to stand out from its background by the method herein mentioned. Thus, a floral or leaf design could be formed by painting on the original white base or on the colored background.

Experience has shown that it is very difficult or impossible to apply the ordinary fish-scale of commerce, even when it has been considerably thinned, by means of a brush, without showing objectionable streaks due to the movement of the brush. Likewise, experience has shown that if the celluloid article is dipped into a fish-scale solution, even after it has been thinned, that the air bubbles which are present in the solution prevent the formation of a uniform coating, because such air bubbles produce breaks or marks in the coating which are plainly visible and which greatly injure its ornamental appearance. This is especially true when large, nonspherical objects are being treated, although this may not be true in coating small, smooth, spherical beads. In any event, it would be very difficult to coat the engraved lines by brushing or dipping, and to produce uniform work, free from marks due to bubbles. However, by making the solution sufficiently thin and by spraying with sufficient pressure, a very thin, firm and uniform coating can be produced, free from all air bubbles, and of a uniform pearly appearance.

After the engraving or other decorative step has been performed, a second thin and transparent coating of the thinned fish-scale solution previously described is sprayed on by an air-brush, under a pressure of about thirty (30) pounds per square inch. The fish-scale solution used for this coating and for subsequent coatings is preferably thinned with a suitable celluloid solvent, such as commercial acetone, and it does not have any dissolved celluloid therein, although I do not limit my invention in this respect.

Four thin and transparent coatings of fish-scale solution are preferably formed by spraying under the conditions before mentioned, upon the engraved surface, each coating being allowed to dry and harden by the evaporation of the volatile solvent, before the next coating is sprayed on. Experience has shown that the nacreous effect is much enhanced if the pearly coating or surface composed of fish-scale is formed in a plurality of layers.

The lines of the original design are thus acentuated in contrast to their background, so that the design has an appearance of a number of separated and sharply defined lines, raised from the base and of a pearly appearance. The entire surface is also given a pearly appearance, but there is a very sharp contrast between the surface layer as a whole and the individual lines of the design, so that a cloisonné effect is produced.

The fish-scale coating thus formed is protected by spraying thereon a plurality (preferably about four or five) coats of celluloid lacquer, said lacquer consisting of celluloid dissolved in a suitable volatile solvent. This is done by an air-brush operating under a pressure of forty to fifty pounds per square inch, and each coat is allowed to dry and harden at room temperature before the next coat is sprayed on. The first protective coating of celluloid should not penetrate the fish-scale coating to any substantial extent, because this would injure the clearness of the design and the cloisonné effect, and even destroy it. Celluloid lacquers having low penetrative power are well-known and are used for protecting the enamel on automobile bodies, and hence I need give no further description thereof.

The celluloid coating thus formed is then preferably buffed so as to render its surface smooth and to make it very thin. Of course, this coating is quite transparent. Experience has shown the final lacquer coating, as well as the previous pearly coating, tends to be deposited more heavily on the engraved lines than on the smooth background of the design. The buffing operation makes the ornamental surface smooth and planar. The smooth surface is now polished with a suitable oily compound to give a glass finish, like real cloisonné.

Hence, the finally completed article (assuming that the celluloid block has a white color) has a cloisonné design appearing in contrast to a colored background. The lines are very sharply defined and appear to stand up from the ornamented surface and the entire design is readily visible and has a general pearly effect.

My invention is not restricted to providing a colored background for the design because an intaglio design formed in a white surface can have the lines thereof accentuated and made to contrast with the background of the design, by using the method previously disclosed.

Likewise, it would be within the scope of my invention, if any suitable coloring matter were mixed with the fish-scale solution used for forming the various layers of fish-scale before mentioned. I prefer however, to have the said fish-scale layers substantially colorless save for the pearly luster typical of this product, and to provide a colored background for the design directly upon the surface of the base, by the step above mentioned.

I have shown a preferred embodiment of my invention, but it is clear that numerous changes and omissions could be made without departing from its spirit.

For example, while I have disclosed an article having certain characteristics and a preferred method for producing the same, I wish to make it clear that the said article might be produced by other methods, and I do not limit the claims for the said article to the production thereof by the method disclosed herein.

While I have mentioned fish-scale throughout, I do not wish to be limited to this substance alone or to the natural product, as substitutes therefor are known in the art. Any substance, or mixture of substances, which can give a light-transmitting pearly effect are to be considered as equivalents for the fish-scale, whenever this is mentioned in the description or claims.

I claim:

1. A method of coloring the surface of a celluloid base which consists in spraying directly thereon a mixture of coloring matter and a celluloid solvent, the said spraying being conducted with sufficient force with respect to the thinness of the mixture to cause the said coloring matter to be uniformly distributed over the surface of the celluloid, to penetrate the same to produce a uniform colored layer.

2. A method of coloring the surface of a celluloid base which consists in spraying directly thereon a mixture of a coloring agent and a celluloid solvent in thin liquid form, the spraying pressure being sufficient and the mixture being sufficiently thin to uniformly distribute the coloring matter to cause it to penetrate the celluloid to form a uniform colored layer, the said spraying pressure being insufficient to carry along lumps of the said coloring agent.

3. A method of forming an intaglio design on the surface of a celluloid base which consists in spraying upon said base a fish-scale solution containing a celluloid solvent, the spraying pressure being sufficient to cause the fish-scale to adhere firmly to the said base without the formation of any air bubbles, allowing the solvent material to evaporate, and then engraving the said coating and base.

4. A method of forming an intaglio design on a base having a colored surface, which consists in first providing a protective coating for the color, said layer being composed of material harder than said color, and then engraving the design.

5. A method of accentuating an intaglio design in a surface which consists in spraying upon said surface a thin fish-scale solution dissolved in a volatile solvent, the spraying pressure being sufficient and the solution being sufficiently thin to prevent the formation of air bubbles.

6. A method according to claim 5 in which a coating is formed by spraying on a series of separate layers as above mentioned, each layer being allowed to dry before the next layer is sprayed on.

7. As a new article of manufacture, a celluloid base having a surface provided with coloring matter imbedded therein, the said surface having an intaglio line design, the said surface having a smooth uniform light-transmitting coating of fish-scale free from air bubbles.

8. As a new article of manufacture, a base having a surface produced with an intaglio line design, the said surface having a smooth uniform light-transmitting coating of fish-scale free from air bubbles.

9. An article according to claim 8 in which the said coating consists of a plurality of layers.

10. As a new article of manufacture, a celluloid base having a surface provided with coloring matter imbedded therein, the said surface having a contrasting intaglio line design, the said surface having a smooth uniform and integral coating free from air bubbles, the inner part of said coating consisting of fish-scale and the outer part of said coating consisting of celluloid, the said coating being substantially transparent.

11. As a new article of manufacture, a celluloid article having a colored surface provided with an intaglio design, and a superposed light-transmitting coating containing fish-scale, said coating having the property of changing the light reflected through it from said colored surface to lighten said color, said coating being free from air bubbles.

12. As a new article of manufacture, a base having a surface provided with an intaglio line design, the said design having a smooth and uniform coating free from air bubbles, the inner part of said coating consisting of fish-scale, and the outer part of said coating consisting of celluloid, the said coating being light-permeable.

In testimony whereof, I affix my signature.

HUGO MANOVILL.